(12) United States Patent
You et al.

(10) Patent No.: US 11,892,630 B2
(45) Date of Patent: Feb. 6, 2024

(54) AUGMENTED REALITY DEVICE INCLUDING FLAT COMBINER AND ELECTRONIC DEVICE INCLUDING THE SAME

(71) Applicant: SAMSUNG ELECTRONICS CO., LTD., Suwon-si (KR)

(72) Inventors: Jangwoo You, Seoul (KR); Byonggwon Song, Seoul (KR); Wontaek Seo, Yongin-si (KR); Changkun Lee, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 727 days.

(21) Appl. No.: 16/813,882

(22) Filed: Mar. 10, 2020

(65) Prior Publication Data
US 2021/0103145 A1    Apr. 8, 2021

(30) Foreign Application Priority Data
Oct. 8, 2019    (KR) .................. 10-2019-0124775

(51) Int. Cl.
G02B 27/01    (2006.01)
G02B 27/09    (2006.01)
F21V 8/00    (2006.01)

(52) U.S. Cl.
CPC ....... *G02B 27/0149* (2013.01); *G02B 6/0026* (2013.01); *G02B 27/0101* (2013.01); *G02B 27/0972* (2013.01); *G02B 27/0983* (2013.01); *G02B 2027/015* (2013.01); *G02B 2027/0118* (2013.01); *G02B 2207/101* (2013.01)

(58) Field of Classification Search
CPC ................... G02B 27/0172; G02B 27/0176
See application file for complete search history.

(56) References Cited

U.S. PATENT DOCUMENTS

| | | | |
|---|---|---|---|
| 7,230,766 B2 | 6/2007 | Rogers | |
| 2014/0044392 A1 | 2/2014 | Fattal et al. | |
| 2020/0075801 A1 | 3/2020 | Chung et al. | |
| 2022/0179222 A1* | 6/2022 | Guo | ..................... G02B 5/1861 |

FOREIGN PATENT DOCUMENTS

KR    1020180133192 A    12/2018

OTHER PUBLICATIONS

Yuan, J., et al., "Design of mechanically robust metasurface lenses for RGB colors", IOP Publishing, Journal of Optics, vol. 19, 2017, pp. 1-9 (10 pages).

* cited by examiner

*Primary Examiner* — Joseph P Martinez
(74) *Attorney, Agent, or Firm* — Sughrue Mion, PLLC

(57) ABSTRACT

An augmented reality device may include: a light source; a display device comprising a plurality of pixels and configured to generate a first image based on light incident from the light source; and an optical combiner comprising a plurality of optical combining units each including a first area and a second area, wherein the first area reflects a plurality of beams constituting the first image at different reflection angles according to wavelengths and incident angles and transfers the reflected plurality of beams to a predetermined viewer position, and the second area transmits a beam of a second image received from outside and transfers the beam of the second image to the predetermined viewer position.

19 Claims, 22 Drawing Sheets

AUGMENTED REALITY DEVICE INCLUDING FLAT COMBINER AND ELECTRONIC DEVICE INCLUDING THE SAME

CROSS-REFERENCE TO RELATED APPLICATION

This application claims priority from Korean Patent Application No. 10-2019-0124775, filed on Oct. 8, 2019, in the Korean Intellectual Property Office, the disclosure of which is incorporated herein by reference in its entirety.

BACKGROUND

1. Field

Apparatuses and methods consistent with example embodiments relate to an augmented reality (AR) device including a flat combiner.

2. Description of Related Art

Recently, the demand for miniaturization of a light projector is increasing more and more for combinations with various electronic devices. For example, to implement augmented reality (AR), virtual reality (VR), and mixed reality (MR) on mobile and wearable devices, a micro light projector may be used.

Particularly, as the demand for AR devices enabling a user to visually recognize desired virtual images while seeing actual images of outside views is increasing, a need for miniaturization of a light projector that is applied to the AR devices is rising.

The light projector that is applied to the AR devices includes a combiner for combining a virtual image generated by a specific signal with an external, actual object to provide the combined result to a user. The combiner may have an optical structure of a reflective type or a diffractive type. The combiner may include a lens module, and the lens module is an obstacle to miniaturization of the light projector. Also, it is difficult to manufacture an optical lens included in the lens module to an exact size, and also it is difficult to assemble and align the manufactured optical lens.

SUMMARY

Various embodiments of the disclosure provide an augmented reality (AR) device miniaturized by including a flat combiner.

Various embodiments of the disclosure provide an AR device miniaturized by including a small-sized optical system for expanding an irradiation area of light from a light source.

Various embodiments of the disclosure provide an electronic device including a miniaturized AR device.

Additional aspects will be set forth in part in the description which follows and, in part, will be apparent from the description, or may be learned by practice of the presented embodiments of the disclosure.

According to an aspect of an example embodiment, there is provided an augmented reality device including: a light source; a display device comprising a plurality of pixels and configured to generate a first image based on light incident from the light source; and an optical combiner comprising a plurality of optical combining units each including a first area and a second area, wherein the first area reflects a plurality of beams constituting the first image at different reflection angles according to wavelengths and incident angles and transfers the reflected plurality of beams to a predetermined viewer position, and the second area transmits a beam of a second image received from outside and transfers the beam of the second image to the predetermined viewer position.

The first area may be configured to collimate a beam being incident from the plurality of pixels.

The first area may include a plurality of phase modulators configured to reflect different wavelengths of the plurality of beams.

The plurality of phase modulators may include a plurality of nanostructures.

At least two nanostructures of the plurality of nanostructures may have different phase modulation amounts with respect to the plurality of beams of the first image.

At least two nanostructures of the plurality of nanostructures may be different in width.

The plurality of nanostructures may have a same height.

The plurality of nanostructures may be spaced at a constant distance.

Each of the plurality of phase modulators may include a layered structure, wherein the layered structure may include: a substrate; a metal layer formed on the substrate; an insulating layer formed on the metal layer; and a plurality of nanostructures formed on the insulating layer.

A color filter may be formed on the insulating layer to cover the plurality of nanostructures.

A plurality of color filters may be provided to cover the plurality of phase modulators, respectively, and the plurality of color filters may be configured to absorb different wavelength areas of the plurality of beams.

The plurality of nanostructures may include $Si_3N_4$.

The second area may include an opening through which the beam of the second image is transmitted.

The augmented reality device may further include an optical system positioned between the light source and the display device, and configured to expand an irradiation area of the light incident from the light source and transfer the light to the display device.

The optical system may include a first beam expanding unit including a first reflective surface inclined with respect to a traveling direction of the light, and the first reflective surface may include a plurality of reflective structures forming a concavo-convex structure.

The optical system may further include a second beam expanding unit including a second reflective surface totally reflecting light from the first beam expanding unit and an exit surface emitting the totally reflected light to the display device.

The second beam expanding unit may be a prism.

The optical system may further include a third beam expanding unit configured to diffract the light from the first beam expanding unit to a predetermined angle and transfer the light to the display device.

The third beam expanding unit may include one of a holographic optical element (HOE) or a diffractive optical element (DOE).

The optical system may include a fourth beam expanding unit, the fourth beam expanding unit including: a light guide plate including an entrance surface to which the light from the light source is incident and an exit surface which is opposite to the entrance surface and which emits the incident light toward the display device; a first input lattice formed on the light guide plate and diffracting the light such that the light from the light source is totally reflected in an inside of the light guide plate and travels in a first direction; a second input lattice formed on the light guide plate and diffracting the light such that the light traveling in the first direction through the first input lattice is totally reflected in the inside of the light guide plate and travels in a second direction that is different from the first direction; and an output lattice formed on the light guide plate, diffracting the light traveling to the inside of the light guide plate through the second input lattice and expanded in the second direction in a direction toward an outside of the light guide plate, and outputting the light.

The display device may include one of a liquid crystal on silicon (LCoS) device or a digital micromirror display (DMD).

Another embodiment of the disclosure provides an electronic device including: a mobile device including a main processor; the augmented reality device, configured to combine a virtual image generated according to a signal from the main processor with an image of an external, actual object and transfer the combined virtual image to the predetermined viewer position; and a control device including a controller configured to adjust brightness of the virtual image.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
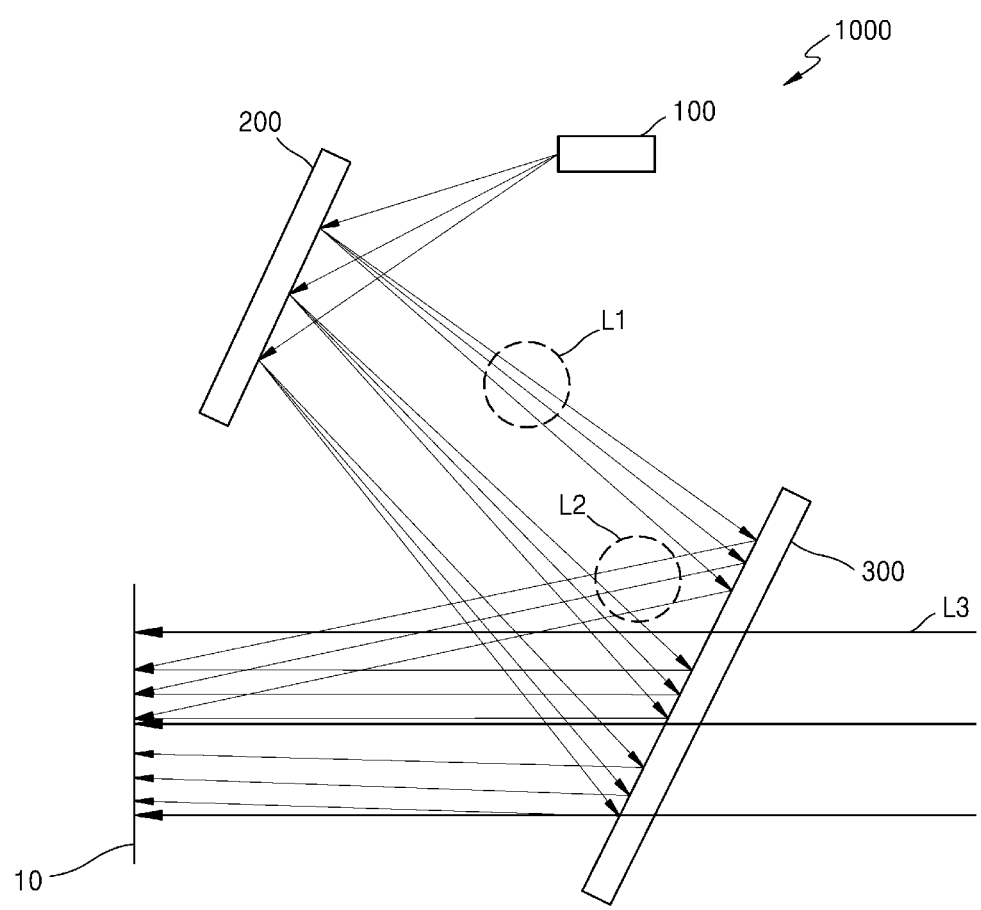
FIG. 1 is a side cross-sectional view schematically showing a configuration of an augmented reality (AR) device according to an embodiment of the disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, a flat combiner according to various embodiments of the disclosure and an electronic device including the flat combiner will be described in detail with reference to the accompanying drawings. In the drawings, like reference numerals refer to like components, and, for clarity of description, the sizes or thicknesses of components are more or less exaggeratedly shown.

It will be understood that, although the terms first, second, etc. may be used herein to describe various components, these components should not be limited by these terms. These terms are only used to distinguish one component from another. An augmented reality (AR) device including a flat combiner and an electronic device including the AR device are not limited to embodiments described below, and may be implemented in various different forms.

Throughout the specification, it will be understood that when a certain part "includes" a certain component, the part does not exclude another component but can further include another component, unless the context clearly dictates otherwise.

Figure 2:
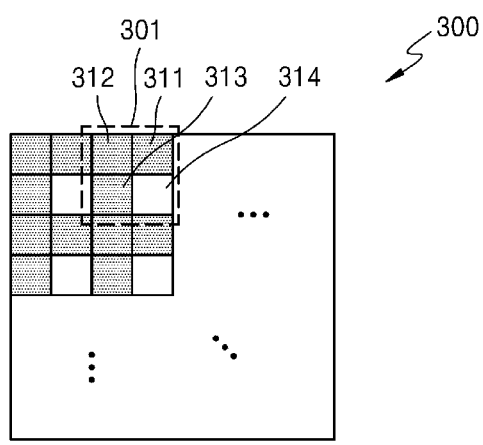
FIG. 2 is a top view schematically showing a configuration of a combiner of FIG. 1.

FIG. 1 is a side cross-sectional view schematically showing a configuration of an AR device 1000 according to an embodiment of the disclosure. FIG. 2 is a top view schematically showing a configuration of a combiner 300 of FIG. 1. The combiner 300 may be also referred to as an optical combiner, and may be constituted as a combination of a phase modulator and a collimator.

Referring to FIG. 1, the AR device 1000 may include a light source 100, a display device 200 including a plurality of pixels and configured to modulate light from the light source 100 independently for each pixel to generate a first image, and a combiner 300 including a plurality of combining units 301 each including a first area and a second area, wherein the first area reflects a plurality of beams constituting the first image at different reflection angles according to wavelengths and incident angles and transfers the reflected beams to a user, and the second area transmits a beam of a second image received from outside and transfers the beam to the user.

The light source 100 may emit monochromatic light of a visible light area. For example, the light source 100 may emit red light, green light, and blue light, sequentially. Accordingly, an image formed by the red light, an image formed by the green light, and an image formed by the blue light may be sequentially provided to the user's cornea. For example, the light source 100 may include a first light source element for emitting red light, a second light source element for emitting green light, and a third light source element for emitting blue light. In this case, the first light source element, the second light source element, and the third light source element may be sequentially driven at time intervals. Also, for example, the light source 100 may include a laser diode for emitting a laser beam. A laser beam emitted from the light source 100 may have coherence. The laser diode may have a narrow spectral line width, and therefore, the laser diode may easily match with the combiner 300.

The display device 200 may include a reflective display device. For example, the display device 200 may include one of a liquid crystal on silicon (LCoS) device or a digital micromirror display (DMD). However, the display device 200 is not limited to the above-mentioned examples, and the display device 200 may include a self-luminous panel display such as organic light emitting diode (OLED) display. In this case, the AR device 1000 may omit the light source 100.

The display device 200 may include a plurality of pixels. Each pixel of the display device 200 may adjust an amount of light being incident from the light source 100 according to a 2Dimensional (2D) image signal received from outside to generate the first image. Light L1 reflected and traveling from an arbitrary one of the pixels of the display device 200 may diffuse and travel toward the combiner 300.

The combiner 300 may combine the first image generated by the display device 200 with the second image received from the outside and provide the combined image to a predetermined viewer's position where the user's cornea 10 is presumed to be located. The first image is also referred to as a virtual image. Also, the second image is referred to as an actual image.

The combiner 300 may include a flat type combiner. For example, the combiner 300 may include a flat type including an inner surface to which light from the display device 200 is incident, and an outer surface which is opposite to the inner surface and to which light from the outside is incident. In the inner surface of the combiner 300, which faces the display device 200, the first area may be positioned to reflect the first image received from the display device 200. The first area may collimate the light L1 emitted from the display device 200. Accordingly, the light L1 emitted from the arbitrary pixel of the display device 200 and being incident to the combiner 300 may be converted into parallel light L2 and travel toward the user's cornea 10. The parallel light L2 being incident to the user's cornea 10 may be focused on the user's retina by the user's lens. Accordingly, the user may recognize the first image.

Also, the combiner 300 may include the second area that transmits light L3 of the second image received from the outside. The second area may include an opening through which the light L3 of the second image is transmitted. The light L3 of the second image received from the outside of the AR device 1000 may be transmitted through the second area to travel toward the user's cornea 10. An exemplary configuration of the first area and the second area will be described with reference to FIG. 2, below.

Referring to FIG. 2, the combiner 300 may include a plurality of light combining units 301. Each light combining unit 301 may include the first area and the second area. For example, the first area may include a plurality of phase modulators of a first phase modulator 311, a second phase modulator 312, and a third phase modulator 313. The first phase modulator 311, the second phase modulator 312, and the third phase modulator 313 may reflect different wavelengths of light. For example, the first phase modulator 311 may reflect a red area of light. The second phase modulator 312 may reflect a green area of light. The third phase modulator 313 may reflect a blue area of light. The second area may include an opening 314 through which the light of the second image from the outside is transmitted. As such, the first image reflected by the first area of the light combining unit 301 may be combined with the second image transmitted by the second area, and the combined image may be provided to the user's cornea 10.

Figure 3:
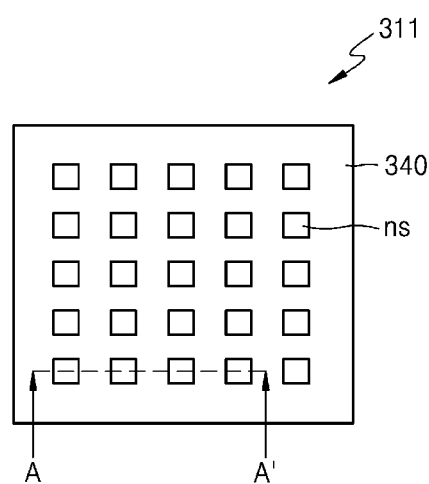
FIG. 3 is a top view briefly showing a configuration of a first phase modulator of FIG. 2.

FIG. 3 is a top view briefly showing a configuration of the first phase modulator 311 of FIG. 2.

Referring to FIG. 3, the first phase modulator 311 may include a plurality of nanostructures ns. The nanostructures ns may be arranged in the form of an array on an insulating layer 340. A refractive index of the nanostructures ns may be greater than that of the insulating layer 340. The nanostructures ns may be artificial structures having a shape dimension of a sub-wavelength. For example, widths, heights, and etc. of the nanostructures ns may be less than a wavelength of light emitted from the light source 100 (see FIG. 1). Also, the nanostructures ns may include $Si_3N_4$. However, the nanostructures ns are not limited to $Si_3N_4$, and may include a material that is different from $Si_3N_4$. In FIG. 3, the nanostructures ns are shown to have the same shape for convenience of description. However, the shape of the nanostructures ns is not limited to the shown shape. For example, the nanostructures ns may have different widths according to their positions.

The second phase modulator 312 and the third phase modulator 313 may also have a similar structure to that of the first phase modulator 311. Accordingly, the second phase modulator 312 and the third phase modulator 313 may each also include a plurality of nanostructures ns. Differences between the first, second, and third phase modulators 311, 312, and 313 will be described with reference to FIGS. 4 to 6, below.

Figure 4:
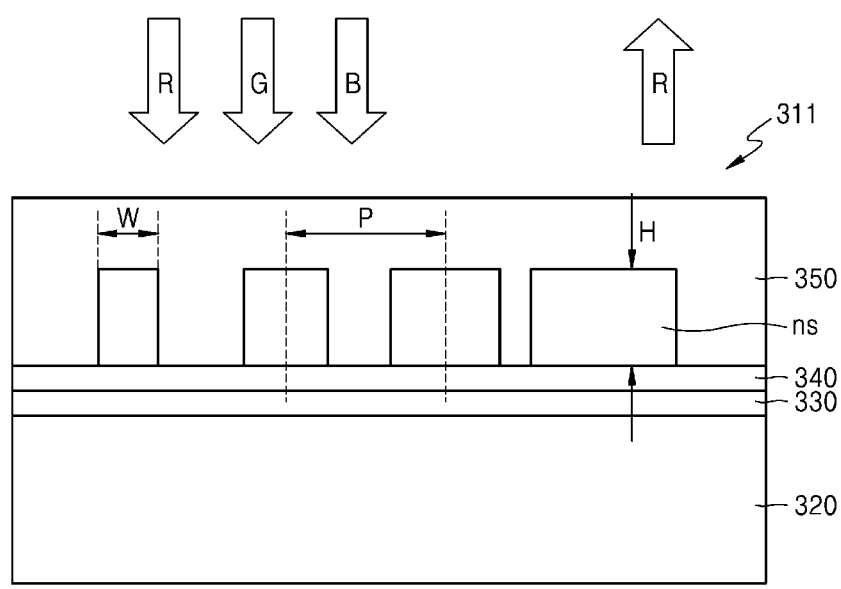
FIG. 4 is a side cross-sectional view briefly showing a cross-section taken along line A-A' of FIG. 3.
Figure 5:
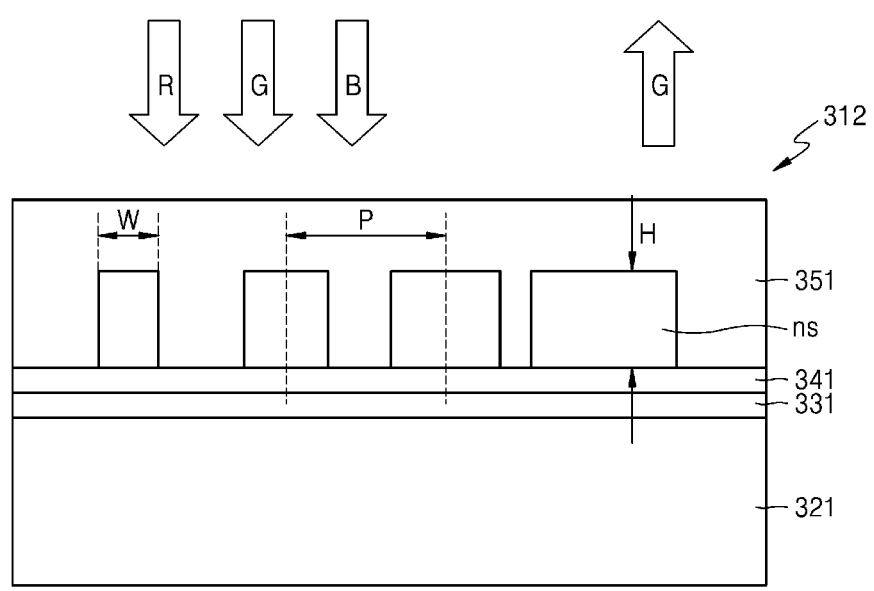
FIG. 5 is a side cross-sectional view briefly showing a configuration of a second phase modulator of FIG. 2.
Figure 6:
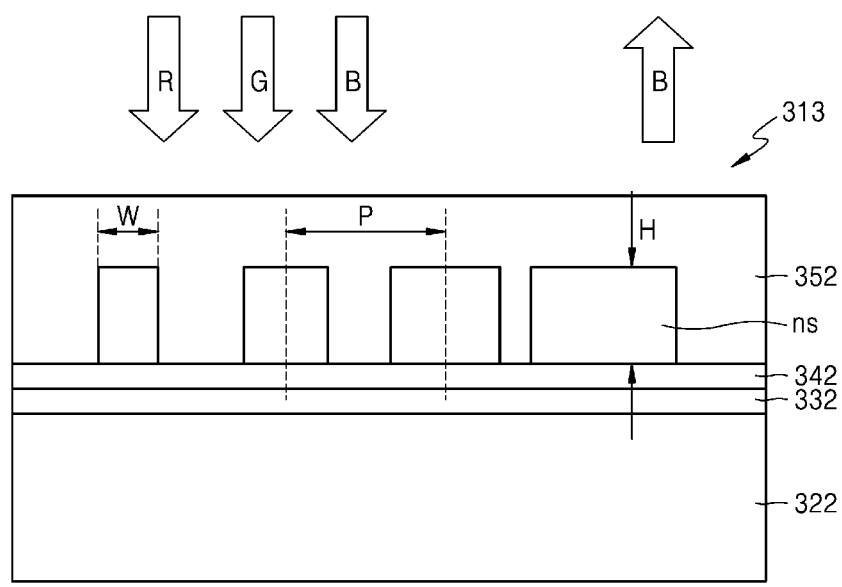
FIG. 6 is a side cross-sectional view briefly showing a configuration of a third phase modulator of FIG. 2.

FIG. 4 is a side cross-sectional view briefly showing a cross-section taken along line A-A' of FIG. 3. FIG. 5 is a side cross-sectional view briefly showing a configuration of the second phase modulator 312 of FIG. 2. FIG. 6 is a side cross-sectional view briefly showing a configuration of the third phase modulator 313 of FIG. 2;

Referring to FIGS. 4 to 6, the first, second, and third phase modulators 311, 312, and 313 may respectively include a plurality of layered structures including a plurality of substrates 320, 321, and 322, a plurality of metal layers 330, 331, and 332 formed on the substrates 320, 321, and 322, a plurality of insulating layers 340, 341, and 342 formed on the metal layers 330, 331, and 332, and a plurality of nanostructures ns formed on the insulating layers 340, 341, and 342. On the insulating layers 340, 341, and 342, a plurality of color filters 350, 351, and 352 may be respectively formed to cover the plurality of nanostructures ns. Each of the color filters 350, 351, and 352 may absorb a predetermined wavelength area of light. For example, the color filter 350 of the first phase modulator 311 may absorb green light G and blue light B of incident light R, G, and B, while not absorbing red light R, as shown in FIG. 4. The color filter 351 of the second phase modulator 312 may absorb red light R and blue light B of incident light R, G, and B, while not absorbing green light G, as shown in FIG. 5. The color filter 352 of the third phase modulator 313 may absorb red light R and green light G of incident light R, G, and B, while not absorbing blue light B, as shown in FIG. 6.

The substrates 320, 321, and 322 may include a silicon oxide (for example, $SiO_2$). However, the substrates 320, 321, and 322 are not limited to a silicon oxide, and the substrates 320, 321, and 322 may include a material that is different from a silicon oxide.

The metal layers 330, 331, and 332 may function as reflective layers to reflect light of the first image being incident from the display device 200. For example, the metal layers 330, 331, and 332 may include aluminum Al, although not limited thereto. However, the metal layers 330, 331, and 332 are not limited to aluminum Al, and the metal layers 330, 331, and 332 may include other metals, such as silver (Ag), gold (Au), copper (Cu), nickel (Ni), iron (Fe), platinum (Pt), etc., which are different from aluminum Al.

The insulating layers 340, 341, and 342 may include the same material as the substrates 320, 321, and 322. For example, the insulating layers 340, 341, and 342 may include a silicon oxide (for example, $SiO_2$). However, the insulating layers 340, 341, and 342 are not limited to a silicon oxide, and the insulating layers 340, 341, and 342 may include other materials that are different from a silicon oxide.

The nanostructures ns may change phases of incident light R, G, and B. Accordingly, the nanostructures ns may modulate phases of the beams of the first image received from the display device 200 (see FIG. 1). For example, at least two of the nanostructures ns may have different phase modulation amounts with respect to the beams of the first image. The individual nanostructures ns may modulate the phases of the plurality of beams constituting the first image independently such that the beams of the first image are collimated.

Because the nanostructures ns are arranged in the form of an array, incident light R, G, and B may be incident to the nanostructures ns at different incident angles. Accordingly, the nanostructures ns may need to have different phase modulation amounts with respect to the incident light R, G, and B to collimate the incident light R, G, and B with the different incident angles.

Phase modulation amounts of the nanostructures ns with respect to incident light R, G, and B may depend on shapes of the nanostructures ns. For example, phase modulation amounts of the nanostructures ns with respect to incident light R, G, and B may depend on heights H, widths W or array spacing P of the nanostructures ns. As shown in FIGS. 4 to 6, by changing the widths W of the nanostructures ns while maintaining the heights H and array spacing P of the nanostructures ns, phase modulation amounts with respect to incident light R, G, and B may change. A correlation between the widths W and phase modulation amounts of the nanostructures ns with respect to incident light will be described with reference to FIGS. 7 to 12, below.

FIGS. 7 to 12 are graphs showing correlations between the widths and phase modulation amounts of the nanostructures ns of FIGS. 4 to 6 with respect to incident light.

In the graphs of FIGS. 7 to 12, left vertical axes represent phase modulation amounts of the nanostructures ns with respect to incident light. Phase modulation amounts are expressed in radians. In the graphs of FIGS. 7 to 12, right vertical axes represent reflectance of the nanostructures ns with respect to incident light.

In an experimental for creating the graphs of FIGS. 7 to 12, an incident angle of incident light with respect to the nanostructures ns may be set to be vertical. A case in which the color filters 351, 352, and 353 covering the nanostructures ns as shown in FIGS. 4 to 6 have been removed may be set. Also, the metal layers 330, 331, and 332 may be set to aluminum layers with a thickness of 100 nm, and the insulating layers 340, 341, and 342 may be set to silicon oxide ($SiO_2$) layers with a thickness of 100 nm. In the graphs of FIGS. 7 to 12, horizontal axes represent widths of the nanostructures ns.

Figure 7:
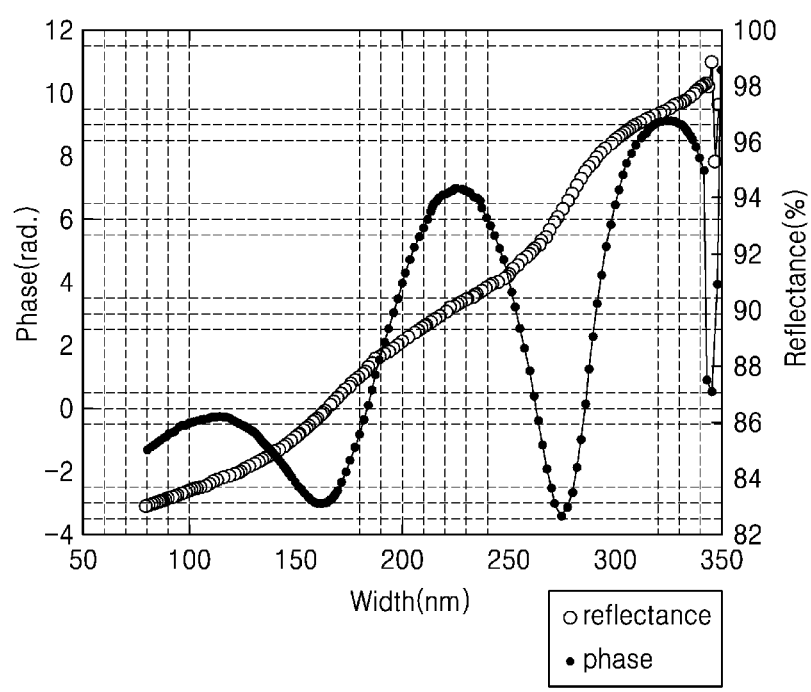
FIG. 7 is a graph showing a correlation of widths and phase modulation amounts of a plurality of nanostructures of FIG. 4 with respect to incident light.
Figure 8:
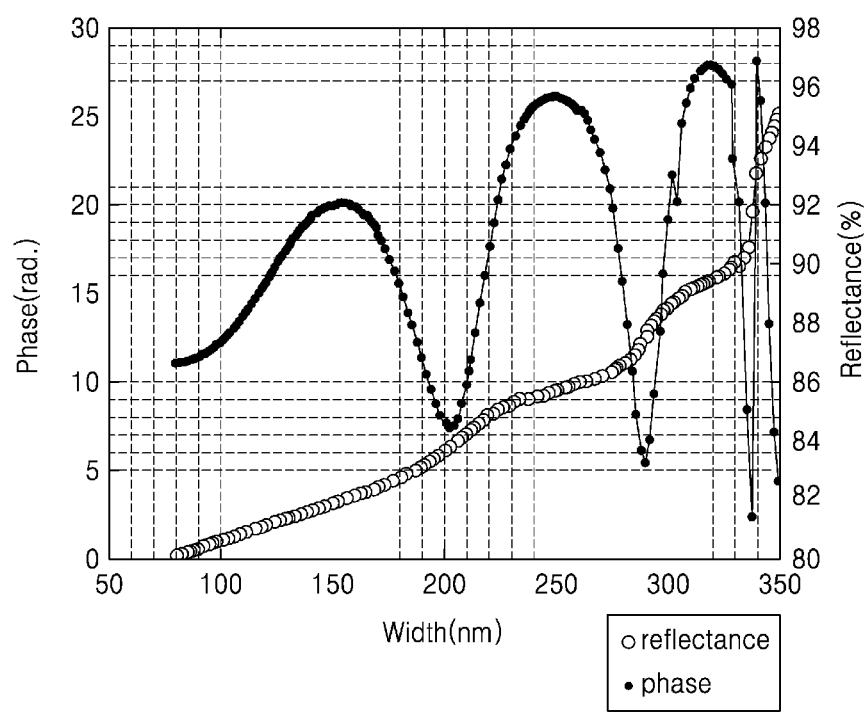
FIG. 8 is a graph showing a correlation of widths and phase modulation amounts of a plurality of nanostructures of FIG. 5 with respect to incident light.
Figure 9:
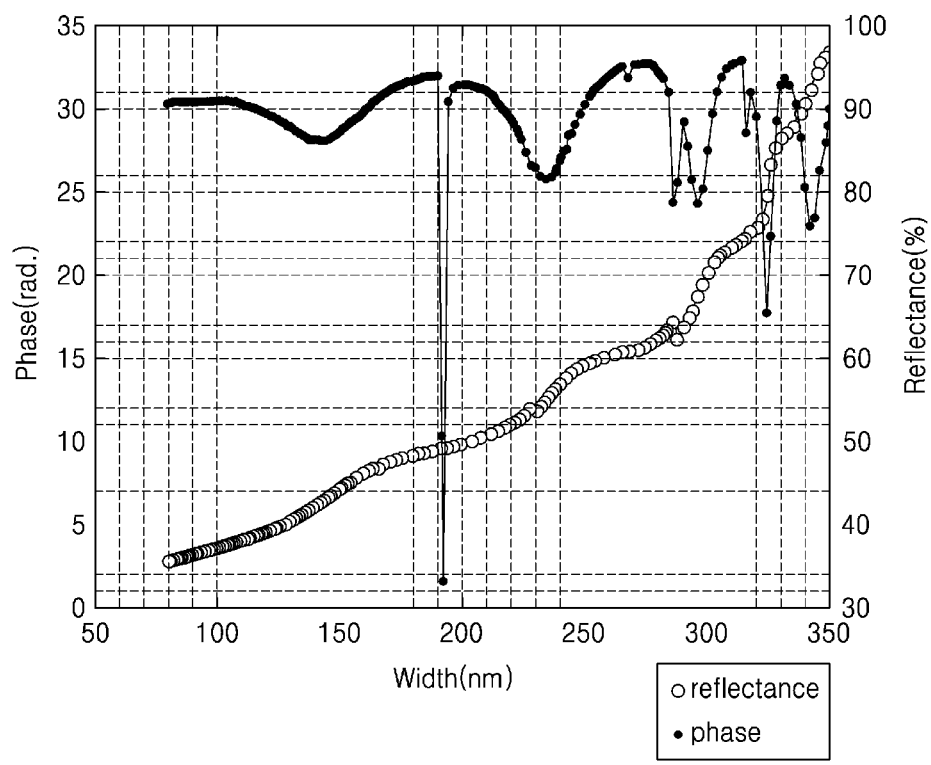
FIG. 9 is a graph showing a correlation of widths and phase modulation amounts of a plurality of nanostructures of FIG. 6 with respect to incident light.

FIGS. 7 to 9 show resultant values when a height of the nanostructures ns is set to a constant height of 440 nm, and spacing between the nanostructures ns is set to constant spacing of 250 nm.

FIG. 7 is a graph showing resultant values when a wavelength of incident light is set to 638 nm. The incident light with the wavelength of 638 nm may be red light. For example, the first phase modulator 311 of FIG. 4, which reflects red light, may be designed with reference to FIG. 7.

Referring to FIG. 7, as the width of the nanostructures ns increases, a phase modulation amount of the nanostructures ns with respect to incident light may increase accordingly. For example, when a width of the nanostructures ns is between about 150 nm and about 280 nm, a phase modulation range of the nanostructures ns with respect to incident light is about 2 pi. Also, when the width of the nanostructures ns is between about 150 nm and about 280 nm, reflectance of the nanostructures ns with respect to incident light is in a range of about 83% to about 94%. As such, there is a width range of the nanostructures ns in which a phase modulation range of the nanostructures ns is 2 pi while reflectance of the nanostructures ns with respect to incident light is maintained at about 83% or higher. By referring to the graph of FIG. 7, a proper width of the nanostructures ns for modulating a phase of red light by a desired amount may be determined. The nanostructures ns may be arranged in the form of an array. The nanostructures ns having proper widths according to positions may be arranged in the form of an array to collimate incident light including a plurality of beams that are incident to the array of the nanostructures ns.

FIG. 8 is a graph showing resultant values when a wavelength of incident light is set to 520 nm. The incident light with the wavelength of 520 nm may be green light. For example, the second phase modulator 312 of FIG. 5, which reflects green light, may be designed with reference to FIG. 8.

Referring to FIG. 8, as a width of the nanostructures ns increases, a phase modulation amount of the nanostructures ns with respect to incident light may increase accordingly. For example, when a width of the nanostructures ns is between about 180 nm and about 270 nm, a phase modulation range of the nanostructures ns with respect to incident light is about 2 pi. Also, when the width of the nanostructures ns is between about 180 nm and about 270 nm, reflectance of the nanostructures ns with respect to incident light is in a range of about 85% to about 95%. As such, there is a width range of the nanostructures ns in which a phase modulation range of the nanostructures ns is 2 pi while reflectance of the nanostructures ns with respect to incident light is maintained at about 85% or higher. By referring to the graph of FIG. 8, a proper width (e.g., a width between about 180 nm and about 270 nm) of the nanostructures ns for modulating a phase of green light by a desired amount may be determined. The nanostructures ns may be arranged in the form of an array. The nanostructures ns having proper widths according to positions may be arranged in the form of an array to collimate incident light including a plurality of beams that are incident to the array of the nanostructures ns.

FIG. 9 is a graph showing resultant values when a wavelength of incident light is set to 450 nm. The incident light with the wavelength of 450 nm may be blue light. For example, the second phase modulator 312 of FIG. 6, which reflects blue light, may be designed with reference to FIG. 9.

Referring to FIG. 9, as a width of the nanostructures ns increases, a phase modulation amount of the nanostructures ns with respect to incident light may increase accordingly. For example, when a width of the nanostructures ns is between about 200 nm and about 300 nm, a phase modulation range of the nanostructures ns with respect to incident light is about 2 pi. Also, when the width of the nanostructures ns is between about 200 nm and about 300 nm, reflectance of the nanostructures ns with respect to incident light is in a range of about 82% to about 95%. As such, there is a width range of the nanostructures ns in which a phase modulation range of the nanostructures ns is 2 pi while reflectance of the nanostructures ns with respect to incident light is maintained at about 82% or higher. By referring to the graph of FIG. 9, a proper width (e.g., a width between about 200 nm and about 300 nm) of the nanostructures ns for modulating a phase of incident light by a desired amount may be determined. The nanostructures ns may be arranged in the form of an array. The nanostructures ns having proper widths according to positions may be arranged in the form of an array to collimate incident light including a plurality of beams that are incident to the array of the nanostructures ns.

Figure 10:
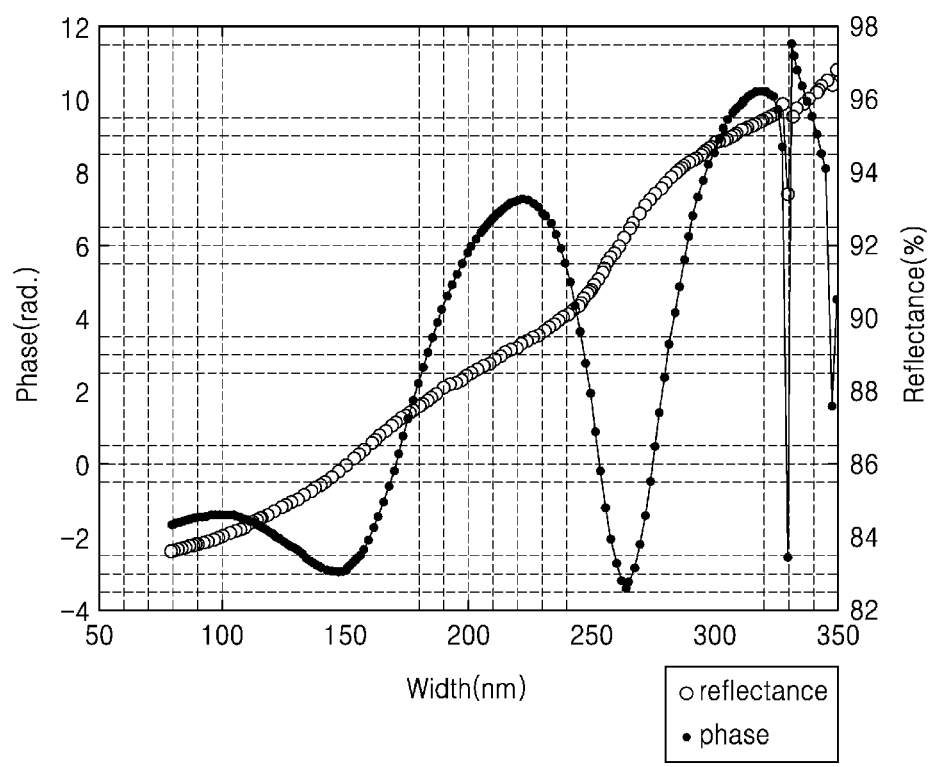
FIG. 10 is a graph showing a correlation of widths and phase modulation amounts of a plurality of nanostructures of FIG. 4 with respect to incident light.
Figure 11:
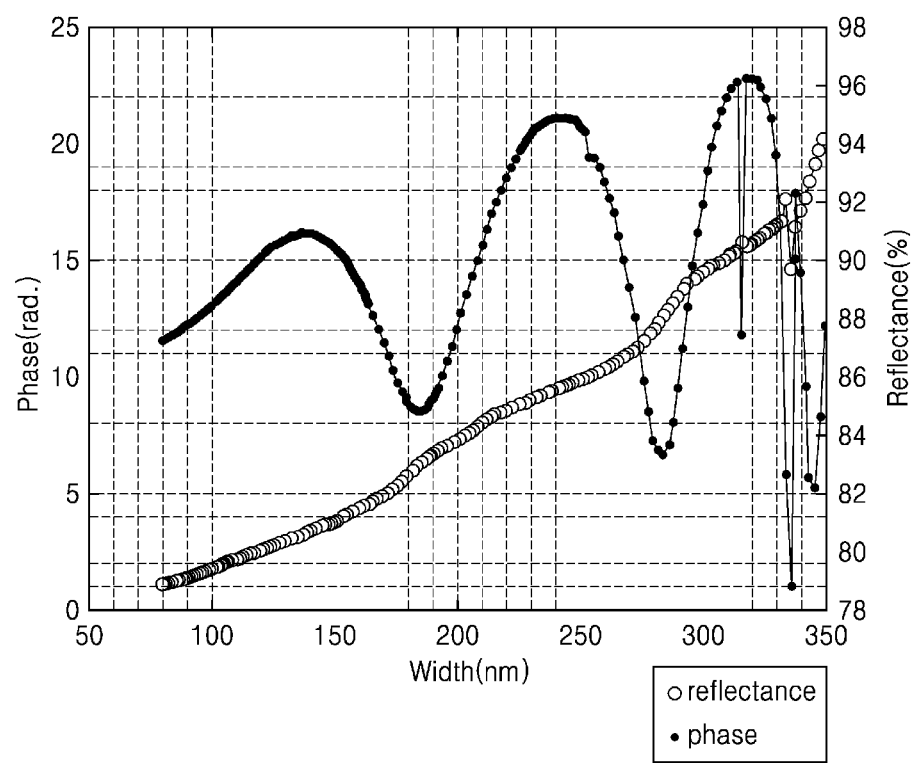
FIG. 11 is a graph showing a correlation of widths and phase modulation amounts of a plurality of nanostructures of FIG. 5 with respect to incident light.
Figure 12:
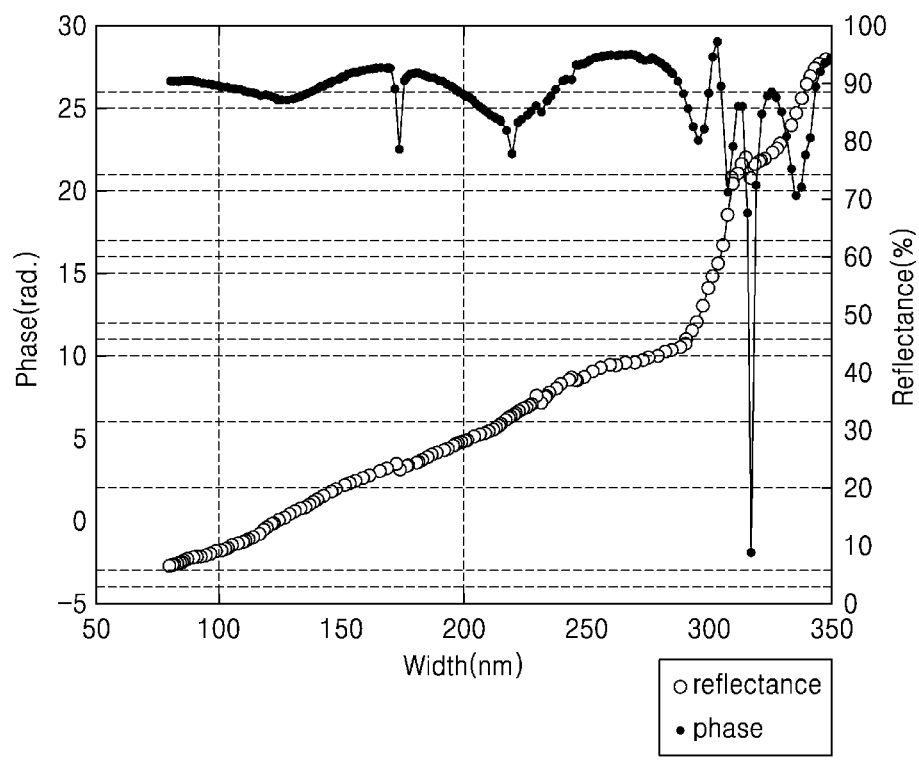
FIG. 12 is a graph showing a correlation of widths and phase modulation amounts of a plurality of nanostructures of FIG. 6 with respect to incident light.

FIGS. 10 to 12 show resultant values when a height of the nanostructures ns is set to a constant height of 480 nm and spacing of the nanostructures ns is set to constant spacing of 270 nm.

FIG. 10 is a graph showing resultant values when a wavelength of incident light is set to 638 nm. The incident light with the wavelength of 638 nm may be red light. For example, the first phase modulator 311 of FIG. 4, which reflects red light, may be designed with reference to FIG. 10.

Referring to FIG. 10, as a width of the nanostructures ns increases, a phase modulation amount of the nanostructures ns with respect to incident light may increase accordingly. For example, when a width of the nanostructures ns is between about 100 nm and about 260 nm, a phase modulation range of the nanostructures ns with respect to incident light is about 2 pi. Also, when the width of the nanostructures ns is between about 100 nm and about 260 nm, reflectance of the nanostructures ns with respect to incident light is in a range of about 83% to about 93%. As such, there is a width range of the nanostructures ns in which a phase modulation range of the nanostructures ns is 2 pi while reflectance of the nanostructures ns with respect to incident light is maintained at about 83% or higher. By referring to the graph of FIG. 10, a proper width (e.g., a width between about 100 nm and about 260 nm) of the nanostructures ns for modulating red light by a desired amount may be determined. The nanostructures ns may be arranged in the form of an array. The nanostructures ns having proper widths according to positions may be arranged in the form of an array to collimate incident light including a plurality of beams that are incident to the array of the nanostructures ns.

FIG. 11 is a graph showing resultant values when a wavelength of incident light is set to 520 nm. The incident light with the wavelength of 520 nm may be green light. For example, the second phase modulator 312 of FIG. 5, which reflects green light, may be designed with reference to FIG. 11.

Referring to FIG. 11, as a width of the nanostructures ns increases, a phase modulation amount of the nanostructures ns with respect to incident light may increase accordingly. For example, when a width of the nanostructures ns is between about 150 nm and about 250 nm, a phase modulation range of the nanostructures ns with respect to incident light is about 2 pi. Also, when the width of the nanostructures ns is between about 150 nm and about 250 nm, reflectance of the nanostructures ns with respect to incident light is in a range of about 85% to about 95%. As such, there is a width range of the nanostructures ns in which a phase modulation range of the nanostructures ns is 2 pi while reflectance of the nanostructures ns with respect to incident light is maintained at about 85% or higher. By referring to the graph of FIG. 11, a proper width (e.g., a width between about 150 nm and about 250 nm) of the nanostructures ns for modulating a phase of green light by a desired amount may be determined. The nanostructures ns may be arranged in the form of an array. The nanostructures ns having proper widths according to positions may be arranged in the form of an array to collimate incident light including a plurality of beams that are incident to the array of the nanostructures ns.

FIG. 12 is a graph showing resultant values when a wavelength of incident light is set to 450 nm. The incident light with the wavelength of 450 nm may be blue light. For example, the third phase modulator 313 of FIG. 6, which reflects blue light, may be designed with reference to FIG. 12.

Referring to FIG. 8, as a width of the nanostructures ns increases, a phase modulation amount of the nanostructures ns with respect to incident light may increase accordingly. For example, when a width of the nanostructures ns is between about 200 nm and about 280 nm, a phase modulation range of the nanostructures ns with respect to incident light is about 2 pi. Also, when the width of the nanostructures ns is between about 200 nm and about 280 nm, reflectance of the nanostructures ns with respect to incident light is in a range of about 80% to about 95%. As such, there is a width range of the nanostructures ns in which a phase modulation range of the nanostructures ns is 2 pi while reflectance of the nanostructures ns with respect to incident light is maintained at about 80% or higher. By referring to the graph of FIG. 12, a proper width (e.g., a width between about 200 nm and about 280 nm) of the nanostructures ns for modulating a phase of incident light by a desired amount may be determined. The nanostructures ns may be arranged in the form of an array. The nanostructures ns having proper widths according to positions may be arranged in the form of an array to collimate incident light including a plurality of beams that are incident to the array of the nanostructures ns.

As described above with reference to FIGS. 7 to 12, the nanostructures ns having different widths may have different phase modulation amounts with respect to incident light with the same wavelength. Therefore, by selecting a proper width of the nanostructures ns, a phase of incident light may be modulated by a desired amount. Accordingly, the nanostructures ns may perform phase modulations by various amounts on incident light being incident at various angles according to positions of the nanostructures ns, thereby collimating the incident light.

Figure 13:
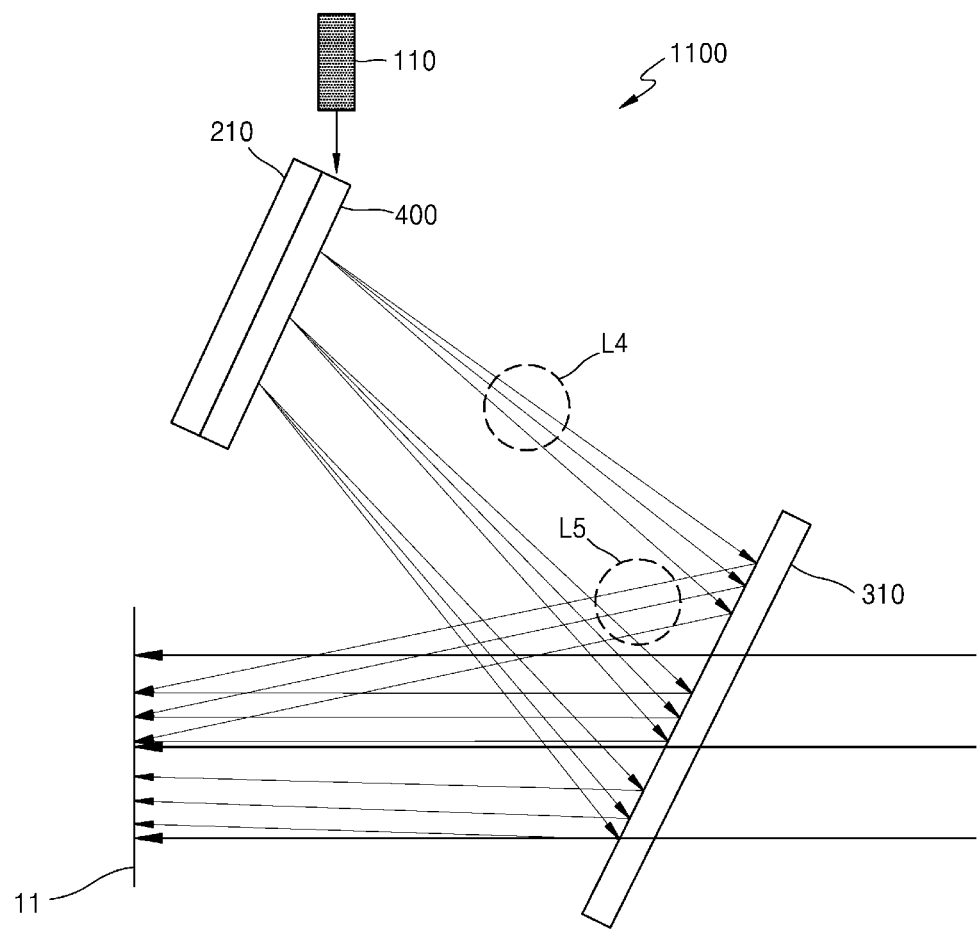
FIG. 13 is a side cross-sectional view schematically showing a configuration of an AR device according to another embodiment of the disclosure.

FIG. 13 is a side cross-sectional view schematically showing a configuration of an AR device 1100 according to another embodiment of the disclosure. The configuration of the AR device 1100 of FIG. 13 is substantially the same as that of the AR device 1000 of FIG. 1, except for an optical system 400. In the following description which will be given with reference to FIG. 13, description already given above with reference to FIG. 1 will be omitted. Accordingly, descriptions about the light source 110, the display device 210, and the combiner 310 will be omitted.

Referring to FIG. 13, the AR device 1100 may include a light source 110, a display device 210 including a plurality of pixels and configured to modulate light from the light source 110 independently for each pixel to generate a first image, and a combiner 310 including a plurality of combining units each having a first area and a second area, wherein the first area reflects a plurality of beams constituting the first image at different reflection angles according to wavelengths and incident angles to transfer the reflected beams to a user, and the second area transmits a beam of a second image received from outside to transfer the beam to the user. In addition, the AR device 1100 may further include the optical system 400 for expanding an irradiation area of light from the light source 110.

The optical system 400 may be positioned between the light source 110 and the display device 210. The light having the irradiation area expanded by the optical system 400 may be transferred to the display device 210. The light having the expanded irradiation area may be modulated and reflected for each pixel by the display device 210 and then again transferred to the optical system 400. The light modulated by the display device 210 may be transmitted through the optical system 400 and transferred to the combiner 310. Light L4 from the optical system 400 may be reflected by the combiner 310 to be collimated into parallel light L5 and then transferred to a user's cornea 11. Details about a configuration of the optical system 400 will be described with reference to FIGS. 14 to 20, below.

Figure 14:
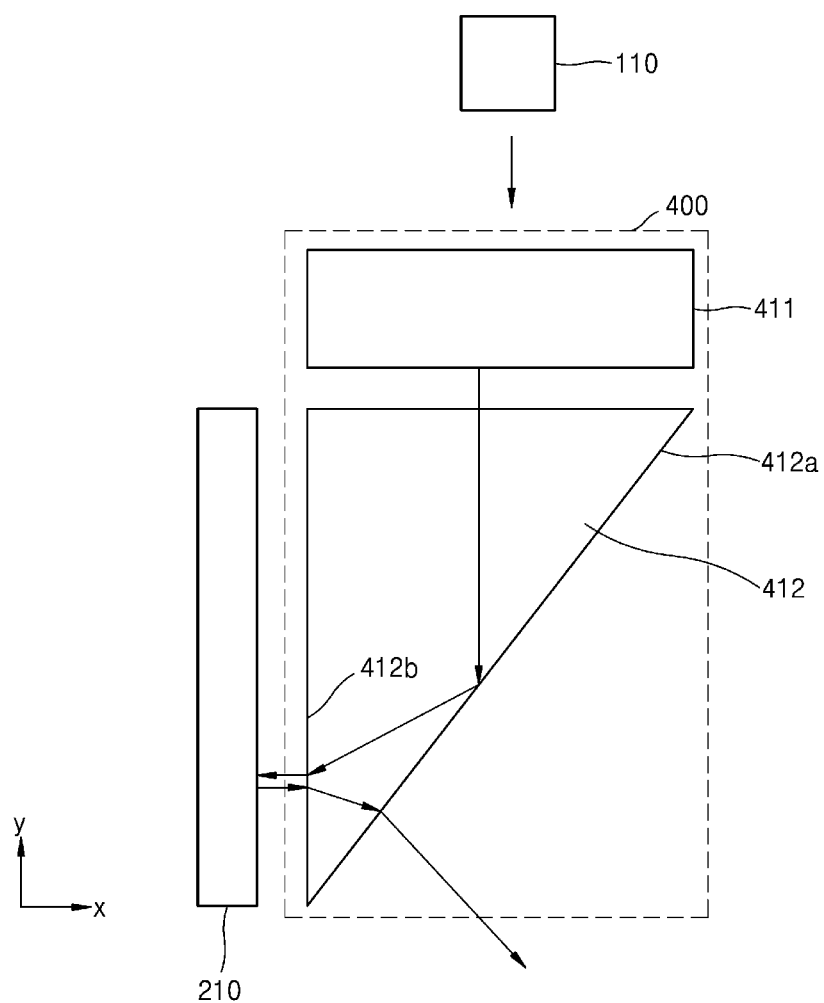
FIG. 14 is a top view schematically showing a configuration of an optical system capable of being applied to the AR device of FIG. 13.
Figure 15:
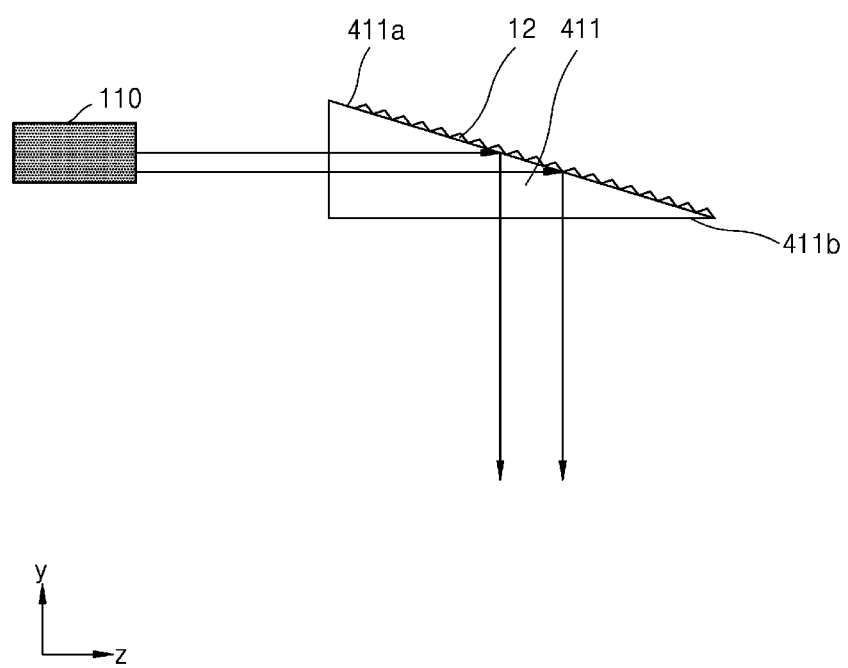
FIG. 15 is a side cross-sectional view schematically showing an arrangement between a light source and a first beam expanding unit of FIG. 14.
Figure 16:
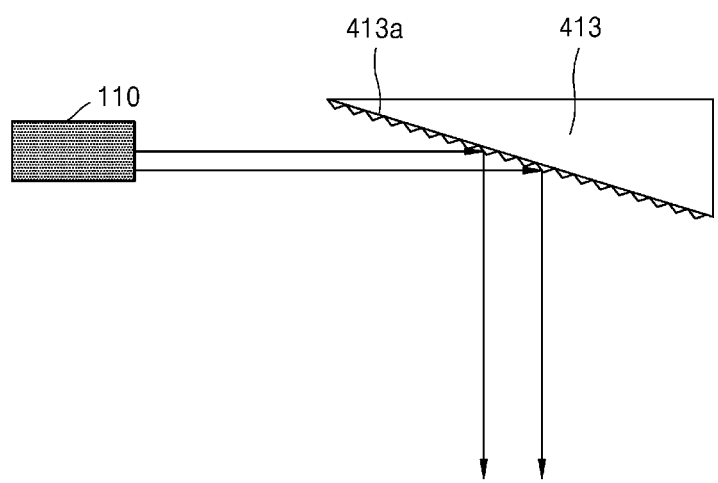
FIG. 16 is a side cross-sectional view schematically showing an exemplary configuration of another first beam expanding unit capable of replacing the first beam expanding unit of FIG. 14.

FIG. 14 is a top view schematically showing a configuration of an optical system (the optical system 400 capable of being applied to the AR device 1100 of FIG. 13. FIG. 15 is a side cross-sectional view schematically showing an arrangement between the light source 110 and a first beam expanding unit 411 of FIG. 14. FIG. 16 is a side cross-sectional view schematically showing an exemplary configuration of another first beam expanding unit 413 capable of replacing the first beam expanding unit 411 of FIG. 14.

Referring to FIG. 14, the optical system 400 may include the first beam expanding unit 411 for primarily expanding an irradiation area of light from the light source 110, and a second beam expanding unit 412 for secondarily expanding an irradiation area of light from the first beam expanding unit 411 and transferring the light to the display device 210. In FIG. 14, the light source 110 is shown to be parallel to the first beam expanding unit 411 in a horizontal direction (y-axis direction), for convenience of description. An arrangement of the light source 110 and the first beam expanding unit 411 will be described with reference to FIG. 15, below.

Referring to FIG. 15, the light source 110 may be spaced in a vertical direction (z-axis direction) from the first beam expanding unit 411. The first beam expanding unit 411 may include a first reflective surface 411a inclined with respect to a traveling direction of light from the light source 110. The first beam expanding unit 411 may include a light transmitting material. Accordingly, light may be transmitted through an inside of the first beam expanding unit 411. Light transmitted through the inside of the first beam expanding unit 411 may be reflected by the first reflective surface 411a formed in one surface of the first beam expanding unit 411. The first reflective surface 411a may have a plurality of reflective structures 12 forming a concavo-convex structure. Each of the reflective structures 12 may have a micro reflective surface inclined with respect to the traveling direction of light from the light source 110. An inclination of the micro reflective surface with respect to the traveling direction of light from the light source 110 may be greater than an inclination of the first reflective surface 411a. As such, by applying the plurality of reflective structures 12 with the micro reflective surfaces having relatively great inclinations to the first beam expanding unit 411, the first beam expanding unit 411 may change a traveling direction of light from the light source 110 by a desired angle with a small inclination of the first reflective surface 411a with respect to the light.

Light from the light source 110 may be transmitted through the light transmitting material of the first beam expanding unit 411, and then reflected by the first reflective surface 411a, so that an irradiation area of the light may be primarily expanded. The light reflected by the first reflective surface 411a may exit an exit surface 411b of the first beam expanding unit 411 to travel toward the second beam expanding unit 412.

Referring again to FIG. 14, the second beam expanding unit 412 may include a second reflective surface 412a for totally reflecting light from the first beam expanding unit 411 or 413. Also, the second beam expanding unit 412 may include an exit surface 412b for emitting the totally reflected light to the display device 210. For example, the second beam expanding unit 412 may be a prism. The prism may be a wedge prism. Light that exited the exit surface 412b and transferred to the display device 210 may be modulated for each pixel and then again travel toward the second beam expanding unit 412. Then, the light may be refracted by the second beam expanding unit 412 and exit the second reflective surface 412a. The light that exited the second reflective surface 412a may travel toward the combiner 310.

Referring to FIG. 16, the first beam expanding unit 413 may include a first reflective surface 413a inclined with respect to a traveling direction of light from the light source 110. The first beam expanding unit 413 may be positioned such that the first reflective surface 413a first meets light from the light source 110. Accordingly, light may be reflected directly by the first reflective surface 413a without being transmitted through the first beam expanding unit 413. In this case, because light needs not to be transmitted through the first beam expanding unit 413, the first beam expanding unit 413 may omit a light transmitting material, unlike the first beam expanding unit 411 of FIG. 14.

As described above with reference to FIG. 14, light from the light source 110 may have an expanded irradiation area through the first beam expanding unit 411 and the second beam expanding unit 412. Also, light from the light source 110 may be modulated by the display device 210. The modulated light having the expanded irradiation area may travel toward the combiner 310.

Figure 17:
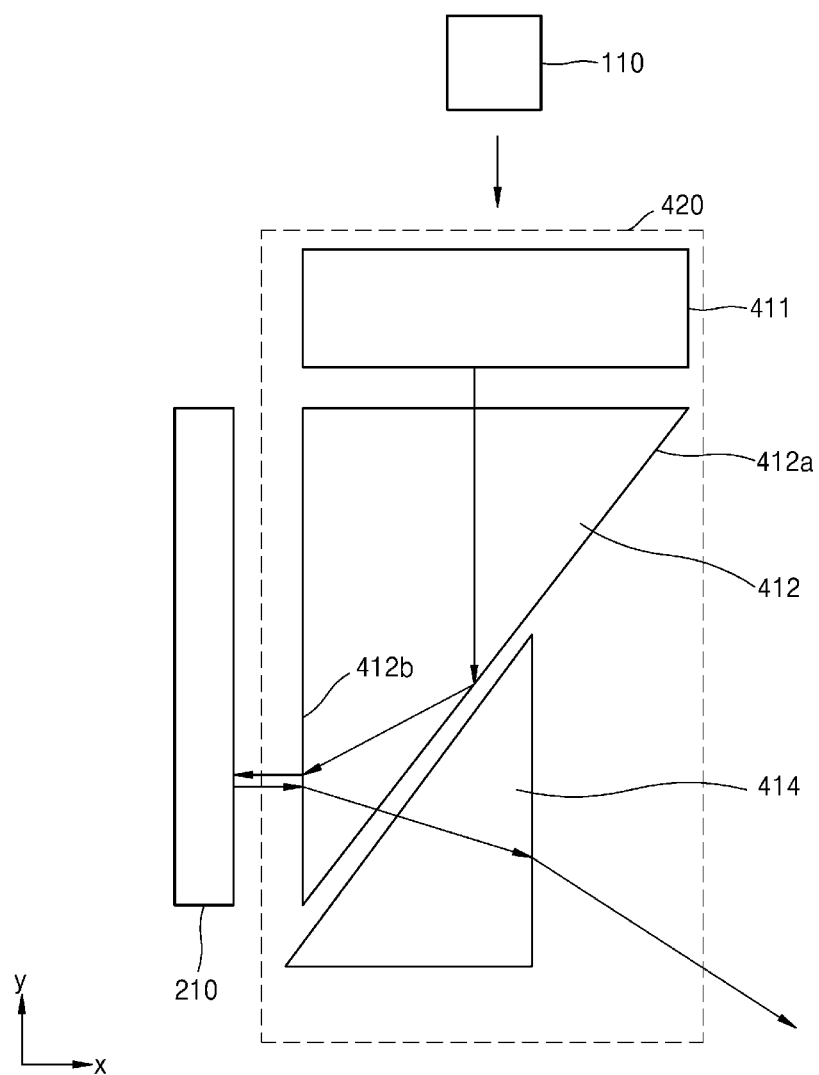
FIG. 17 is a top view schematically showing a configuration of another optical system capable of being applied to the AR device of FIG. 13.

FIG. 17 is a top view schematically showing a configuration of another optical system 420 capable of being applied to the AR device 1100 of FIG. 13.

Referring to FIG. 17, the optical system 420 may further include an optical member 414 for changing a traveling path of light on a traveling path of light exiting the second beam expanding unit 412 and traveling toward the combiner 310, unlike the optical system 400 of FIG. 14. For example, the optical member 414 may be a prism. The prism may be a wedge prism. Light from the second beam expanding unit 412 may be refracted by the optical member 414. Because the optical system 420 causes light to travel in a desired direction by using a refractive force of the optical member 414, the optical system 420 may more efficiently transfer light to the combiner 310.

Figure 18:
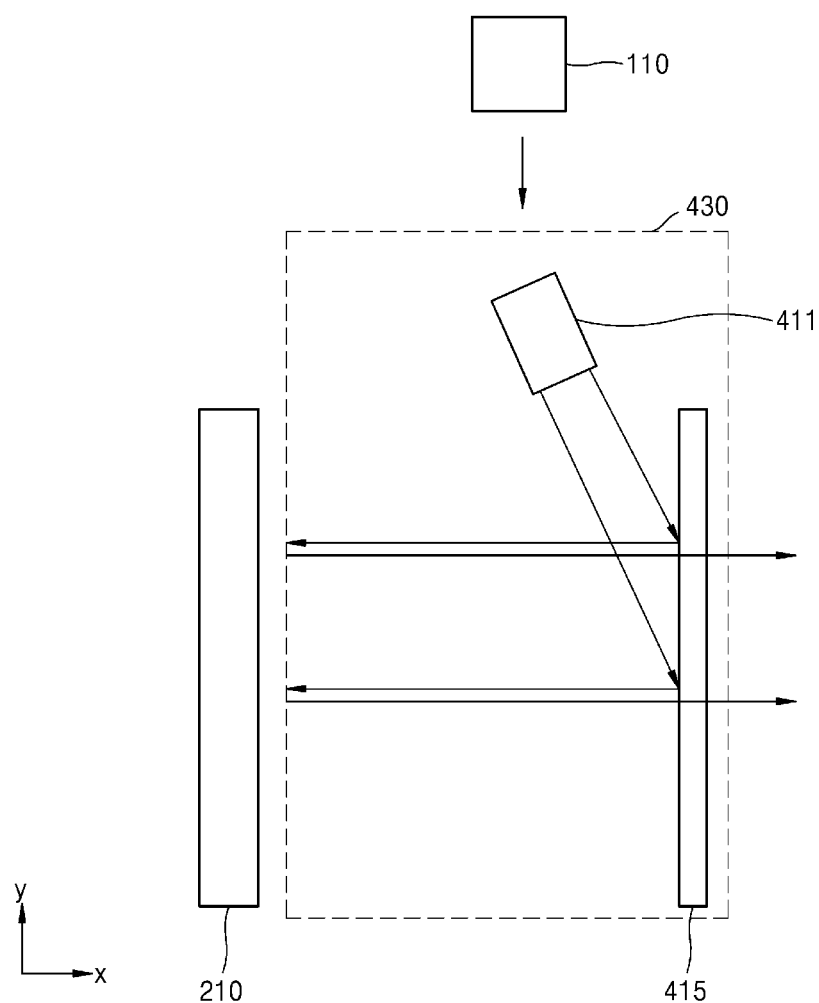
FIG. 18 is a top view schematically showing a configuration of another optical system capable of being applied to the AR device of FIG. 13.
Figure 19:
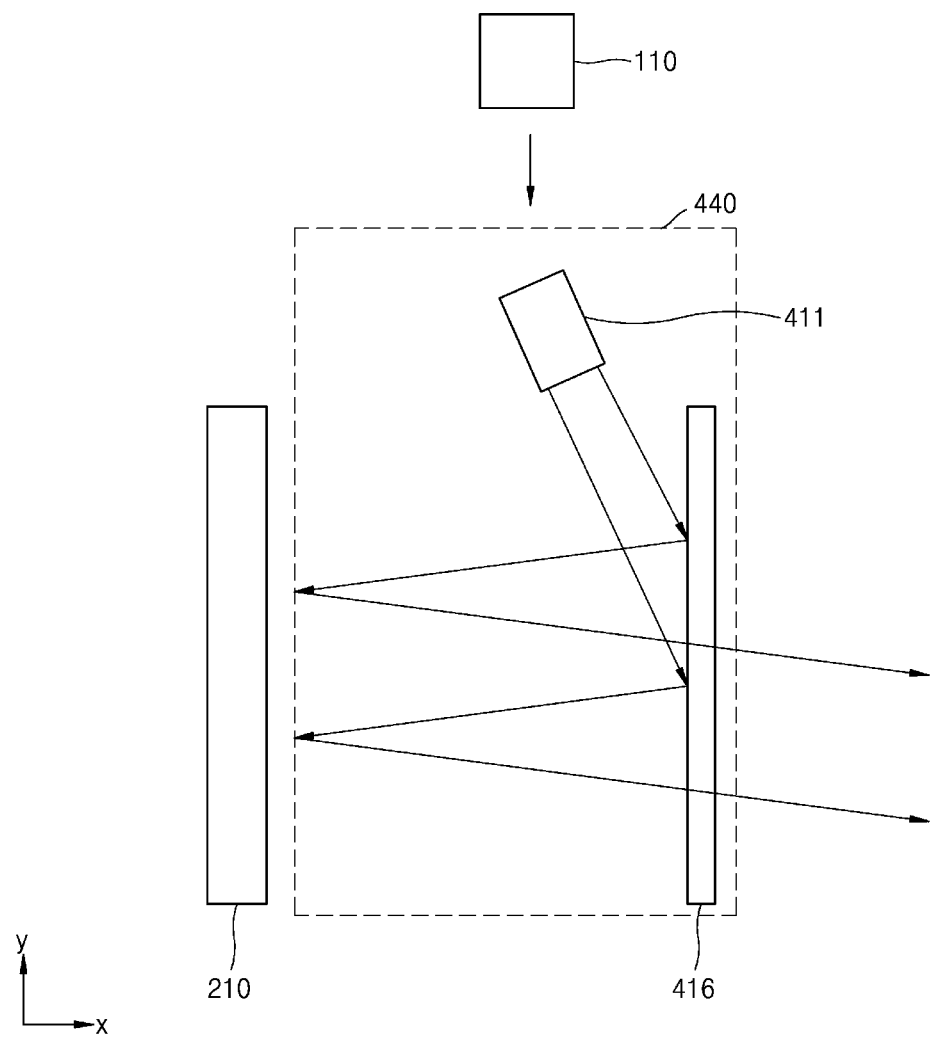
FIG. 19 is a top view schematically showing a configuration of another optical system capable of being applied to the AR device of FIG. 13.

FIG. 18 is a top view schematically showing a configuration of another optical system 430 capable of being applied to the AR device 1100 of FIG. 13. FIG. 19 is a top view schematically showing a configuration of another optical system 440 capable of being applied to the AR device 1100 of FIG. 13.

Referring to FIG. 18, the optical system 430 may include a third beam expanding unit 415, instead of the second beam expanding unit 412, unlike the optical system 400 of FIG. 14. The third beam expanding unit 415 may be a flat diffractive optical element. For example, the third beam expanding unit 415 may include one of a holographic optical element (HOE) and a diffractive optical element (DOE). The third beam expanding unit 415 may be positioned on a traveling path of light between the first beam expanding unit 411 and the display device 210. In this case, the first beam expanding unit 411 may be inclined with respect to the third beam expanding unit 415 such that light from the first beam expanding unit 411 is incident with a predetermined incident angle that is smaller than 90 degrees with respect to one surface of the third beam expanding unit 415. The third beam expanding unit 415 may diffract light from the first beam expanding unit 411 to a predetermined angle and transfer the diffracted light to the display device 210. For example, the third beam expanding unit 415 may diffract light such that light is incident vertically to the display device 210. The display device 200 may modulate the vertically incident light for each pixel, and then reflect the modulated light vertically toward the third beam expanding unit 415. Light from the display device 210 may be transmitted through the third beam expanding unit 415 and travel toward the combiner 310.

Referring to FIG. 19, the optical system 440 may include a third beam expanding unit 416, instead of the second beam expanding unit 412, unlike the optical system 400 of FIG. 14. The third beam expanding unit 416 may be a flat diffractive optical element. For example, the third beam expanding unit 416 may include one of an HOE and a DOE. The third beam expanding unit 416 may be positioned on a traveling path of light between the first beam expanding unit 411 and the display device 210. In this case, the first beam expanding unit 411 may be inclined with respect to the third beam expanding unit 416, such that light from the first beam expanding unit 411 is incident with a predetermined incident angle that is smaller than 90 degrees with respect to one surface of the third beam expanding unit 416. The third beam expanding unit 416 may diffract light from the first beam expanding unit 411 to a predetermined angle and transfer the diffracted light to the display device 210. For example, the third beam expanding unit 416 may diffract light such that light from the first beam expanding unit 411 is incident with an inclination angle, not vertically, to the display device 210, unlike the third beam expanding unit 415 of FIG. 18. The display device 210 may modulate the light being incident with the inclination angle for each pixel, and reflect the modulated light at a predetermined angle toward the third beam expanding unit 416. Light from the display device 210 may be transmitted through the third beam expanding unit 416 and travel toward the combiner 310.

Figure 20:
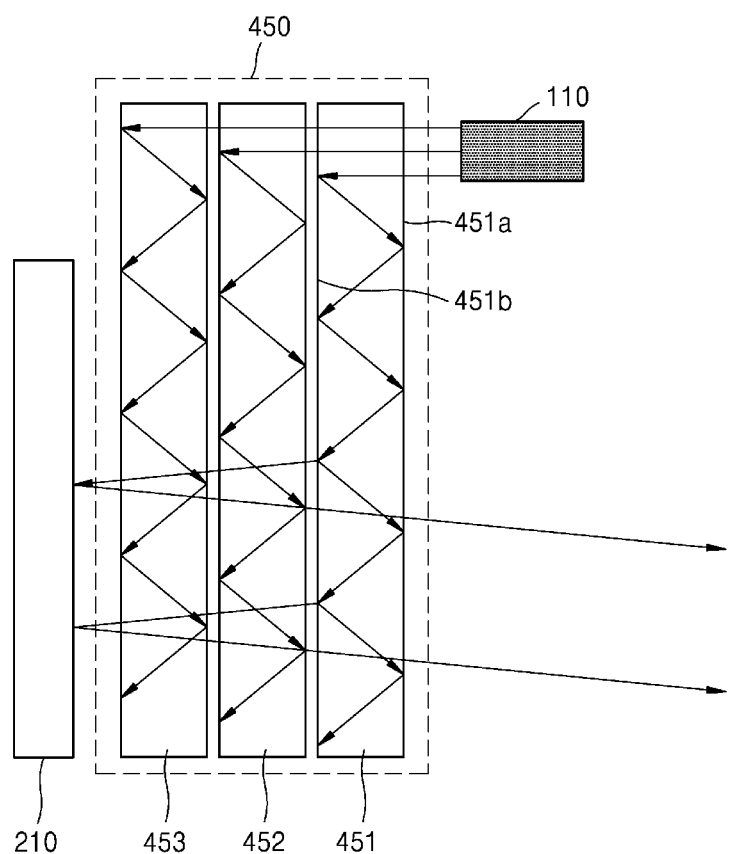
FIG. 20 is a top view schematically showing another configuration of an optical system capable of being applied to the AR device of FIG. 13.
Figure 21:
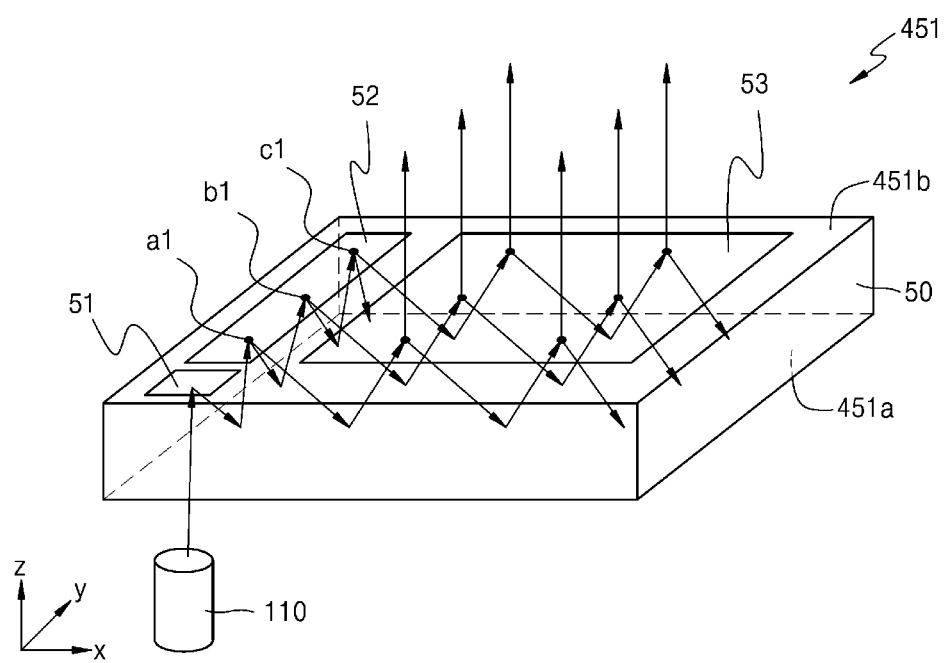
FIG. 21 is a perspective view briefly showing a configuration of a fourth beam expanding unit of FIG. 20.

FIG. 20 is a top view schematically showing another configuration of an optical system 450 capable of being applied to the AR device 1100 of FIG. 13. FIG. 21 is a perspective view briefly showing a configuration of a fourth beam expanding unit 451 of FIG. 20.

Referring to FIG. 20, the optical system 450 may be positioned between the light source 110 and the display device 210. The optical system 450 may totally reflect light from the light source 110 to expand an irradiation area of the light, and transfer the light with the expanded irradiation area to the display device 210. Light from the optical system 450 may be modulated and reflected for each pixel by the display device 210, and then again travel toward the optical system 450. The light reflected by the display device 210 may be transmitted through the optical system 450 and travel toward the combiner 310. The first beam expanding unit 411 of FIG. 14 may be further positioned between the optical system 450 and the light source 110. In this case, light from the light source 110 may have an irradiation area primarily expanded by the first beam expanding unit 411. Furthermore, light passing through the first beam expanding unit 411 may be again transmitted through the optical system 450 to have a secondarily expanded irradiation area.

The optical system 450 may include a layered structure configured with a plurality of fourth beam expanding units 451, 452, and 453. The fourth beam expanding units 451, 452, and 453 may expand irradiation areas of light of different wavelength areas, respectively. For example, the fourth beam expanding unit 451 positioned closest to the light source 110 may expand an irradiation area of red light. Blue light and green light may be not totally reflected in an inside of the fourth beam expanding unit 451. Also, the fourth beam expanding unit 452 positioned in a center of the layered structure may expand an irradiation area of green light. Blue light and red light may be not totally reflected in an inside of the fourth beam expanding unit 452. Also, the fourth beam expanding unit 453 positioned closest to the display device 210 may expand an irradiation area of blue light. Green light and red light may be not totally reflected in an inside of the fourth beam expanding unit 453. The fourth beam expanding units 451, 452, and 453 may emit the light having the expanded irradiation areas toward the display device 210. The display device 210 may modulate and reflect the light from the fourth beam expanding units 451, 452, and 453 for each pixel to cause the light to again travel toward the optical system 450. The light from the display device 210 may be transmitted through the optical system 450 and travel toward the combiner 310, although not limited thereto. However, an order in which the fourth beam expanding units 451, 452, and 453 are layered may change. Hereinafter, a configuration of an arbitrary one of the fourth beam expanding units 451, 452, and 453, and a principle in which an irradiation area of light from the light source 110 is expanded will be described with reference to FIG. 21.

Referring to FIG. 21, the fourth beam expanding unit 451 may include a light guide plate 50 including an entrance surface 451a to which light from the light source 110 is incident and an exit surface 451b which is opposite to the entrance surface 451a and which emits the incident light toward a display device, a first input lattice 51 formed on the light guide plate 50 and diffracting light such that the light from the light source 110 is totally reflected in an inside of the light guide plate 50 and travels in a first direction (y-axis direction), a second input lattice 52 formed on the light guide plate 50 and diffracting light such that the light traveling in the first direction (y-axis direction) through the first input lattice 51 is totally reflected in the inside of the light guide plate 50 and travels in a second direction (x-axis direction) that is different from the first direction (y-axis direction), and an output lattice 53 formed on the light guide plate 50 and diffracting light traveling to the inside of the light guide plate 50 through the second input lattice 52 and expanded in the second direction (x-axis direction) in a direction toward an outside of the light guide plate 50 to output the light.

The light guide plate 50 may be a passage through which light from the light source 110 travels. The light guide plate 50 may convert spot light being incident from the light source 110 into surface light, and output the surface light. For example, light from the light source 110 may travel to the inside of the light guide plate 50 so that an irradiation area of the light is expanded by the first input lattice 51, the second input lattice 52, and the output lattice 53, and then the light may be output to the outside of the light guide plate 50.

The first input lattice 51 may be positioned on the light guide plate 50 and diffract light from the light source 110 such that the light is totally reflected in the inside of the light guide plate 50 and travels in the first direction (y-axis direction). The first input lattice 51 may have a sufficient area for all spot light from the light source 110 to be incident to. The first input lattice 51 may be formed on the exit surface 451b of the light guide plate 50, although not limited thereto. However, the first input lattice 51 may be formed on the entrance surface 451a of the light guide plate 50.

The second input lattice 52 may be positioned on the light guide plate 50 in such a way to be spaced in the first direction (y-axis direction) from the first input lattice 51, and the second input lattice 52 may diffract light such that light traveling in the first direction (y-axis direction) through the first input lattice 51 is totally reflected in the inside of the light guide plate 50 and travels in the second direction (x-axis direction) that is different from the first direction (y-axis direction). The first direction (y-axis direction) may be perpendicular to the second direction (x-axis direction). An area of the second input lattice 52 may be larger than that of the first input lattice 51. For example, a length in first direction (y-axis direction) of the second input lattice 52 may be longer than that in first direction (y-axis direction) of the first input lattice 51. A part of light diffracted by the first input lattice 51 may continue to be totally reflected at a plurality of points (for example, a1, b1, and c1) of the second input lattice 52, which are aligned in the first direction (y-axis direction), and the other part of the light may be diffracted in the second direction (x-axis direction). Accordingly, an irradiation area of light having an irradiation area corresponding to the area of the first input lattice 51 may be expanded to an area of the second input lattice 52, so that the light travels in the second direction (x-axis direction). In FIG. 21, the points a1, b1, and c1 are shown to be spaced by a predetermined distance, for convenience of description.

The points a1, b1, and c1 indicate points at which light is incident to the second input lattice 52 when being totally reflected. The second input lattice 52 may be positioned on the exit surface 451b of the light guide plate 50, although not limited thereto. However, the second input lattice 52 may be positioned on the entrance surface 451a of the light guide plate 50.

The output lattice 53 may be spaced in the second direction (x-axis direction) from the second input lattice 52 on the light guide plate 50 and diffract light traveling to the inside of the light guide plate 50 through the second input lattice 52 and having an irradiation area expanded in the second direction (x-axis direction) in a direction (z-axis direction) toward the outside of the light guide plate 50 to output the light. An area of the output lattice 53 may be larger than that of the second input lattice 52. For example, a length in the second direction (x-axis direction) of the output lattice 53 may be longer than that in the second direction (x-axis direction) of the second input lattice 52. A part of light diffracted by the second input lattice 52 may continue to be totally reflected at a plurality of points of the output lattice 53, which are aligned in the second direction (x-axis direction), and the other part of the light may be diffracted in the direction toward the outside of the light guide plate 50 and output. Accordingly, an irradiation area of light having an irradiation area corresponding to the area of the second input lattice 52 may be expanded to the area of the output lattice 53, and the light is output to the outside of the light guide plate 50.

In FIG. 21, a configuration in which the first input lattice 51, the second input lattice 52, and the output lattice 53 are arranged clockwise in this order to expand an irradiation area of light from the light source 110 is shown. However, an arrangement of the first input lattice 51, the second input lattice 52, and the output lattice 53 is not limited to that shown in FIG. 21, and the first input lattice 51, the second input lattice 52, and the output lattice 53 may be arranged counterclockwise in this order.

The configuration including the light guide plate 50, the first input lattice 51, the second input lattice 52, and the output lattice 53 may be applied to the fourth beam expanding units 451, 452, and 453. In this case, the first input lattice 51, the second input lattice 52, and the output lattice 53 included in each of the fourth beam expanding units 451, 452, and 453 may diffract light of different wavelength areas. For example, the first input lattice 51, the second input lattice 52, and the output lattice 53 included in the fourth beam expanding unit 451 may diffract red light. In this case, blue light and green light may be transmitted through the fourth beam expanding unit 451, without being totally reflected in the inside of the fourth beam expanding unit 451. Also, the first input lattice 51, the second input lattice 52, and the output lattice 53 included in the fourth beam expanding unit 452 may diffract green light. In this case, red light and blue light may be transmitted through the fourth beam expanding unit 452, without being totally reflected in the inside of the fourth beam expanding unit 452. Also, the first input lattice 51, the second input lattice 52, and the output lattice 53 included in the fourth beam expanding unit 453 may diffract blue light. In this case, red light and green light may be transmitted through the fourth beam expanding unit 453, without being totally reflected in the inside of the fourth beam expanding unit 453.

Figure 22:
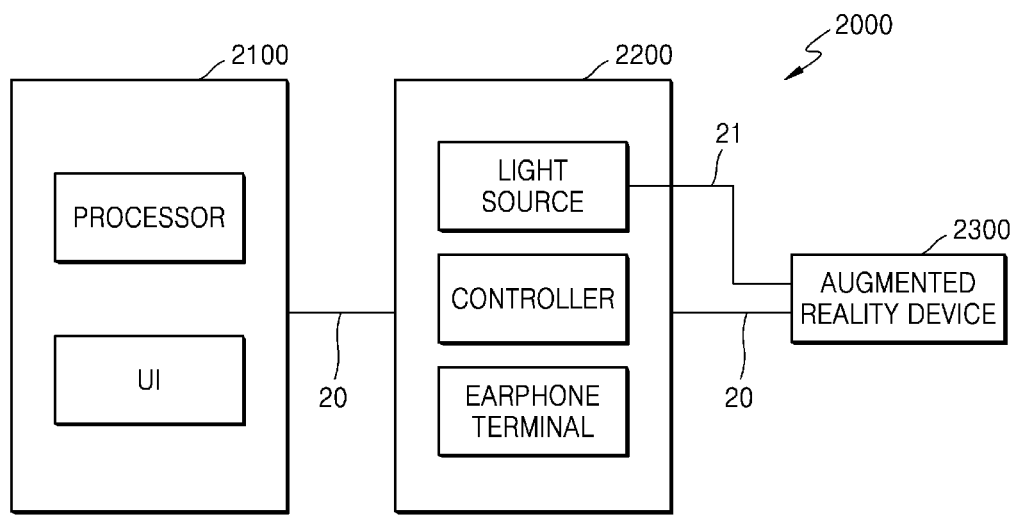
FIG. 22 briefly shows a configuration of an electronic device according to an embodiment of the disclosure.

FIG. 22 briefly shows a configuration of an electronic device 2000 according to an embodiment of the disclosure.

Referring to FIG. 22, the electronic device 2000 may include a mobile device 2100 including a main processor, an AR device 2300 for combining a virtual image generated according to a signal from the main processor with an image of an external, actual object, and transferring the combined image to a user, and a control device 2200 including a controller for adjusting brightness of the virtual image.

The mobile device 2100 may further include a user interface UI in addition to the main processor. The user interface UI may receive a signal related to a predetermined virtual image from outside (for example, a user) of the mobile device 2100. For example, the user interface UI may include at least one of a touch screen, a physical button, a voice recognizer, and a motion recognizer. The main processor of the mobile device 2100 may include, for example, at least one hardware of a central processing unit (CPU), a microprocessor, a graphics processing unit (GPU), application specific integrated circuits (ASICs), digital signal processors (DSPs), digital signal processing devices (DSPDs), programmable logic devices (PLDs), and field programmable gate arrays (FPGAs), although not limited thereto.

The control device 2200 may be positioned between the AR device 2300 and the mobile device 2100. The control device 2200 may be electrically connected to the AR device 2300 and the mobile device 2100 through a data line 20. The control device 2200 may function as a medium of transferring a signal related to a virtual image from the mobile device 2100 to the AR device 2300. The AR device 2300 may include one of the AR devices 1000 and 1100 described above with reference to FIGS. 1 to 21.

Also, a user may adjust brightness of a virtual image generated by the AR device 2300 according to a signal from the mobile device 2100, by using the controller of the control device 2200. For example, the user may adjust brightness of a light source by using the controller. In this case, the light source may be provided in the control device 2200, not in the AR device 2300. Light from the light source included in the control device 2200 may travel to the AR device 2300 through an optical waveguide 21. In addition, the control device 2200 may further include an earphone terminal. The user may connect an earphone to the earphone terminal to receive a voice by a voice signal transferred from the mobile device 2100. In this case, the user may adjust a volume of the voice by using the controller included in the control device 2200.

Various embodiments of the disclosure may miniaturize a combiner of a light projector that may be applied to an AR device.

Various embodiments of the disclosure may adjust the widths of a plurality of nanostructures included in a combiner so that the combiner collimates incident light to provide the light to the user.

Various embodiments of the disclosure may include a small-sized optical system that expands an irradiation area of light from a light source by having a reflective surface of a concavo-convex structure including a plurality of reflective structures, thereby providing a miniaturized AR device.

Various embodiments of the disclosure may provide an electronic device including a miniaturized AR device.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An augmented reality device comprising:
   a light source;
   a display device comprising a plurality of pixels and configured to generate a first image based on light incident from the light source; and
   an optical combiner comprising a plurality of optical combining units each including a first area and a second area, wherein the first area reflects a plurality of beams constituting the first image at different reflection angles according to wavelengths and incident angles and transfers the reflected plurality of beams to a predetermined viewer position, and the second area transmits a beam of a second image received from outside and transfers the beam of the second image to the predetermined viewer position,
   wherein the first area comprises a plurality of phase modulators configured to reflect different wavelengths of the plurality of beams,
   wherein the plurality of phase modulators comprise a plurality of nanostructures,
   wherein the second area comprises an opening through which the beam of the second image is transmitted, and
   wherein, the first area of the optical combiner is configured to receive the plurality of beams at different incident angles, and reflect the plurality of beams at different reflection angles to cause the plurality of beams to travel in parallel, and
   wherein the first area which receives the plurality of beams at the different incident angles, and reflects the plurality of beams at the different reflection angles, is a part of an integral structure, and faces the light source at a same angle.

2. The augmented reality device of claim 1, wherein the first area is configured to collimate a beam being incident from the plurality of pixels,
   the plurality of phase modulators comprises a first phase modulator, a second phase modulator, and a third phase modulator configured to reflect a red waveband, a green waveband, and a blue waveband of the light incident from the display device, respectively, and
   the first phase modulator, the second phase modulator, the third phase modulator, and the opening are arranged in a two-by-two grid form.

3. The augmented reality device of claim 1, wherein at least two nanostructures of the plurality of nanostructures have different phase modulation amounts with respect to the plurality of beams of the first image.

4. The augmented reality device of claim 1, wherein at least two nanostructures of the plurality of nanostructures are different in width.

5. The augmented reality device of claim 1, wherein the plurality of nanostructures have a same height.

6. The augmented reality device of claim 1, wherein the plurality of nanostructures are spaced at a constant distance.

7. The augmented reality device of claim 1, wherein each of the plurality of phase modulators comprises a layered structure, wherein the layered structure comprises:
   a substrate;
   a metal layer formed on the substrate;
   an insulating layer formed on the metal layer; and
   the plurality of nanostructures formed on the insulating layer.

8. The augmented reality device of claim 7, wherein a color filter is formed on the insulating layer to cover the plurality of nanostructures.

9. The augmented reality device of claim 7, wherein a plurality of color filters are provided to cover the plurality of phase modulators, respectively, and the plurality of color filters are configured to absorb different wavelength areas of the plurality of beams.

10. The augmented reality device of claim 1, wherein the plurality of nanostructures include $Si_3N_4$.

11. The augmented reality device of claim 1, further comprising an optical system positioned between the light source and the display device and configured to expand an irradiation area of the light incident from the light source and transfer the light to the display device.

12. The augmented reality device of claim 11, wherein the optical system comprises a first beam expanding unit including a first reflective surface inclined with respect to a traveling direction of the light, and the first reflective surface includes a plurality of reflective structures forming a concavo-convex structure.

13. The augmented reality device of claim 12, wherein the optical system further comprises a second beam expanding unit including a second reflective surface totally reflecting light from the first beam expanding unit and an exit surface emitting the totally reflected light to the display device.

14. The augmented reality device of claim 13, wherein the second beam expanding unit includes a prism.

15. The augmented reality device of claim 12, wherein the optical system further comprises a third beam expanding unit configured to diffract the light from the first beam expanding unit to a predetermined angle and transfer the light to the display device.

16. The augmented reality device of claim 15, wherein the third beam expanding unit comprises one of a holographic optical element (HOE) or a diffractive optical element (DOE).

17. The augmented reality device of claim 12, wherein the optical system comprises a fourth beam expanding unit, the fourth beam expanding unit comprising:

a light guide plate including an entrance surface to which the light from the light source is incident and an exit surface which is opposite to the entrance surface and which emits the incident light toward the display device;

a first input lattice formed on the light guide plate and diffracting the light such that the light from the light source is totally reflected in an inside of the light guide plate and travels in a first direction;

a second input lattice formed on the light guide plate and diffracting the light such that the light traveling in the first direction through the first input lattice is totally reflected in the inside of the light guide plate and travels in a second direction that is different from the first direction; and an output lattice formed on the light guide plate, diffracting the light traveling to the inside of the light guide plate through the second input lattice and expanded in the second direction in a direction toward an outside of the light guide plate, and outputting the light.

18. The augmented reality device of claim 1, wherein the display device comprises one of a liquid crystal on silicon (LCoS) device or a digital micromirror display (DMD).

19. An electronic device comprising:

a mobile device including a main processor;

the augmented reality device of claim 1, configured to combine a virtual image generated according to a signal from the main processor with an image of an external, actual object and transfer a combined image of the virtual image and the image of the external, actual object to the predetermined viewer position; and a control device including a controller configured to adjust brightness of the virtual image.

\* \* \* \* \*